United States Patent [19]
Lee et al.

[11] Patent Number: 6,136,896
[45] Date of Patent: Oct. 24, 2000

[54] GRAFT COPOLYMERS CONTAINING POLYDIORGANOSILOXANE AND POLYBUTYLENE GRAFTS

[75] Inventors: Michael Kang-Jen Lee, Midland; Kenneth M. Lee, Bay City; Deborah Lynn Meyers, Midland, all of Mich.

[73] Assignee: Dow Corning Corporation, Midland, Mich.

[21] Appl. No.: 09/219,745

[22] Filed: Dec. 21, 1998

[51] Int. Cl.⁷ .............................. C08K 5/15; C08K 5/06; C08K 3/30; C08F 30/08
[52] U.S. Cl. .............................. 524/27; 524/35; 524/779; 524/787; 524/791; 524/806; 524/837; 526/79; 526/279
[58] Field of Search ..................... 524/806, 837, 524/789, 35, 27, 779, 787, 791; 526/279, 79

[56] References Cited

U.S. PATENT DOCUMENTS

| | | | |
|---|---|---|---|
| 5,241,035 | 8/1993 | Ono et al. .................................. | 528/26 |
| 5,665,828 | 9/1997 | Lee ........................................... | 525/285 |
| 5,731,379 | 3/1998 | Kennan et al. .......................... | 524/806 |

FOREIGN PATENT DOCUMENTS

WO 96/00562  1/1996  WIPO.

*Primary Examiner*—Margaret G. Moore
*Assistant Examiner*—Kuo-Liang Peng
*Attorney, Agent, or Firm*—Timothy J. Troy

[57] ABSTRACT

This invention relates to graft copolymers containing polydiorganosiloxane and polybutylene grafts. More particularly this invention relates to a graft copolymer having a backbone and two or more polymeric side chains, the copolymer formed from the copolymerization of at least one acryloxyalkyl-functional polydiorganosiloxane macromonomer, at least one acryl-terminated, carboxyl-functional polybutylene macromonomer, and at least one ethylenically unsaturated monomer which is copolymerizable with the polydiorganosiloxane and polybutylene macromonomers. This invention also relates to a method of making graft copolymers containing polydiorganosiloxane and polybutylene grafts.

39 Claims, No Drawings

GRAFT COPOLYMERS CONTAINING POLYDIORGANOSILOXANE AND POLYBUTYLENE GRAFTS

FIELD OF THE INVENTION

This invention relates to graft copolymers containing polydiorganosiloxane and polybutylene grafts. More particularly this invention relates to a graft copolymer having a backbone and two or more polymeric side chains, the copolymer formed from the copolymerization of at least one acryloxyalkyl-functional polydiorganosiloxane macromonomer, at least one acryl-terminated, carboxyl-functional polybutylene macromonomer, and at least one ethylenically unsaturated monomer which is copolymerizable with the polydiorganosiloxane and polybutylene macromonomers. This invention also relates to a method of making graft copolymers containing polydiorganosiloxane and polybutylene grafts.

BACKGROUND OF THE INVENTION

Graft copolymers containing polyorganosiloxane grafts have been described in the art. For example, Ono et al. in U.S. Pat. No. 5,241,035 disclose a graft copolymer comprising a trunk polymer having a vinyl chloride/vinyl alcohol copolymer containing vinyl chloride and vinyl alcohol as the essential constituent monomer units, and a branch polymer comprising an polyorganosiloxane grafted onto said trunk polymer.

In WO 96/00562 is disclosed a hair care composition comprising (A) a thermoplastic elastomeric copolymer having a backbone and two or more hydrophobic polymeric side chains, said copolymer formed from the copolymerization of randomly repeating A, B, and C units wherein the copolymer comprises (i) from 20 to 90% by weight of the A units, wherein the A units are monomer units copolymerizable with the B and C units, (ii) from 10 to 60% by weight of the B unit, wherein the B units are hydrophobic macromonomer units having a polymeric portion and a moiety copolymerizable with the A and C units, and (iii) from 0 to 20% by weight of the C units, wherein the C units are polysiloxane macromonomer units having a polymeric portion and a moiety copolymerizable with the A and B units, wherein the A units, in conjunction with the copolymerizable moieties of the B units and the C units, form the backbone, wherein the polymeric portion of the B units forms the hydrophobic side chains, wherein the copolymer has a weight average molecular weight greater than 10,000, and wherein the copolymer exhibits at least two distinct Tg values, the first Tg corresponding to the backbone and having a value less than 0° C., and the second Tg corresponding to the hydrophobic polymeric side chains and having a value greater than 25 C.; and (B) a water-insoluble, volatile solvent for the copolymer suitable for application to the hair.

Lee in U.S. Pat. No. 5,665,828 discloses a polybutylene polymer or oligomer which contains in its molecule at least one acryl group, the polybutylene being prepared by reacting an anhydride-functional polybutylene, or derivative thereof, with an acryl-functional compound having at least one hydroxyl-containing group, chlorine, isocyanate group, epoxy group, or amine group in its molecule.

Kennan et al. in U.S. Pat. No. 5,731,379 disclose a method of making a copolymer in an emulsion comprising heating and shearing a reaction mixture formed by combining (i) water, (ii) an anionic surfactant, a cationic surfactant, a nonionic surfactant, or a combination thereof, optionally (iii) a co-surfactant which is a hydrophobic solvent, or a compound selected from the group consisting of fatty alcohols, n-alkanes, and halogen substituted n-alkanes, (iv) a mono-acryloxyalkyl terminated polydiorganosiloxane macromonomer or a monomethacryloxy-terminated polydiorganosiloxane macromonomer, (v) an acrylic or metbacrylic-functional polyisobutylene macromonomer, optionally (vi) a radical polymerizable monomer, and (vii) a free radical initiator.

SUMMARY OF THE INVENTION

The present invention relates to organopolysiloxane-modified graft copolymers having two or more polymeric side chains, the copolymer formed from the copolymerization of at least one acryloxyalkyl-functional polydiorganosiloxane macromonomer, at least one acryl-terminated, carboxyl-functional polybutylene macromonomer, and at least one ethylenically unsaturated monomer which is copolymerizable with the polydiorganosiloxane and polybutylene macromonomers.

This invention also relates to a method of making graft copolymers containing polydiorganosiloxane and polybutylene grafts comprising (I) heating a mixture comprising at least one ethylenically unsaturated monomer, at least one acryloxyalkyl-functional polydiorganosiloxane macromonomer, at least one acryl-terminated, carboxyl-functional polybutylene macromonomer, and a free radical initiator. The mixture can further comprise a solvent, or the mixture can also comprise at least one surfactant and water, or the mixture can further comprise at least one suspending agent and water.

When the ethylenically unsaturated monomer is a vinyl ester such as vinyl acetate, the method can further comprise adding a base compound to the product of (I).

Thus it is an object of this invention to make a graft copolymer using radically copolymerizable macromonomeric polydiorganosiloxanes and macromonomeric polybutylenes.

It is another object of this invention to produce graft copolymers which have good water repellency and good water impermeability in addition to good film forming properties.

DETAILED DESCRIPTION OF THE INVENTION

This invention relates to a graft copolymer comprising a backbone and at least two polymeric side chains, the graft copolymer formed from the copolymerization of randomly repeating ethylenically unsaturated monomer units, acryloxyalkyl-functional polydiorganosiloxane macromonomer units, and acryl-terminated, carboxyl-functional polybutylene macromonomer units, wherein the copolymer comprises: (A) at least one ethylenically unsaturated monomer, (B) at least one acryl-terminated, carboxyl-functional polybutylene macromonomer having its formula selected from the group consisting of

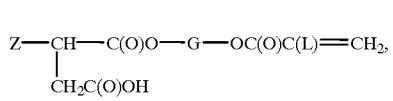

(ii)

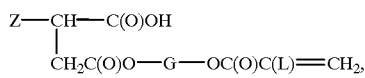

(iii) a mixture of (i) and (ii), (iv)

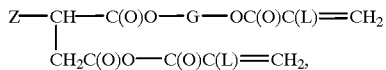

(v)

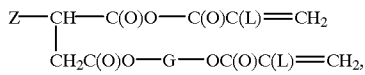

(vi) a mixture of (iv) and (v), (vii)

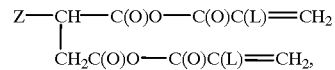

(viii)

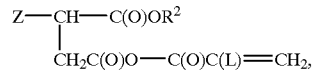

(ix)

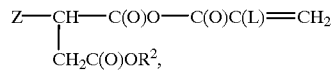

(x) a mixture of (viii) and (ix), (xi)

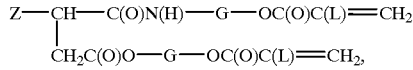

(xii)

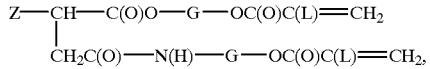

(xiii) a mixture of (xi) and (xii), (xiv)

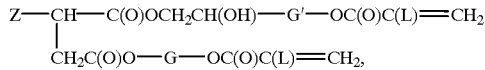

(xv)

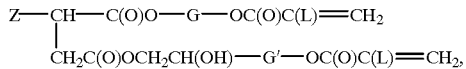

(xvi) a mixture of (xiv) and (xv), (xvii)

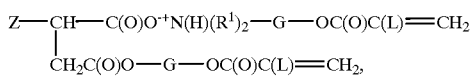

(xviii)

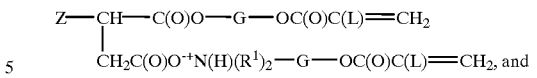

(xix) a mixture of (xvii) and (xviii)

wherein Z represents a polybutylene chain, G is independently an alkylene group having 2 to 10 carbon atoms, G' is independently an alkylene group having from 1 to 10 carbon atoms, L is independently selected from the group consisting of hydrogen and an alkyl group having from 1 to 18 carbon atoms, $R^2$ is selected from the group consisting of methyl, ethyl, and propyl, and $R^1$ is independently an alkyl radical having from 1 to 6 carbon atoms, and (C) at least one acryloxyalkyl-functional polydiorganosiloxane macromonomer, wherein the ethylenically unsaturated monomer units, in conjunction with the copolymerizable moieties of the acryloxyalkyl-functional polydiorganosiloxane macromonomer units and the acryl-terminated, carboxyl-functional polybutylene macromonomer units, form the backbone, and wherein the polymeric portion of the acryloxyalkyl-functional polydiorganosiloxane macromonomer units form at least one side chain and the polymeric portion of the acryl-terminated, carboxyl-functional polybutylene macromonomer units form at least one side chain.

"Graft copolymer" is a term familiar to those of ordinary skill in polymer science and is used to describe copolymers onto which another chemical moiety has been added or "grafted", and means that these copolymers can contain pendant polymeric side chains, or in other words, these polymers can be formed from the "grafting" or incorporation of polymeric side chains onto or into the copolymer.

The term "macromonomer" is one familiar to those of ordinary skill in polymer science, and is used to describe a polymeric material containing a polymerizable moiety. In other words, a macromonomer is a macromolecular monomer, which is essentially a high molecular weight type of monomer building block unit which can be used in a polymerization reaction to form polymers with itself, with other monomers, or with other macromonomers.

The ethylenically unsaturated monomer (A) must be copolymerizable with components (B) and (C). Either a single ethylenically unsaturated monomer or combinations of two or more ethylenically unsaturated monomers can be used. By "copolymerizable" as used herein means monomers that can be copolymerized using any conventional synthetic techniques. Monomers that are copolymerizable using conventional free radical initiated techniques are preferred. The term "ethylenically unsaturated" is used herein to mean monomers that contain at least one polymerizable carbon-carbon double bond (which can be mono-, di-, tri-, or tetra-substituted).

The ethylenically unsaturated monomers of component (A) are exemplified by acrylic acid esters, vinyl esters, N-alkyl acrylamnides, alkyl vinyl ethers, alkyl substituted styrenes, dienes, and acrylonitrile.

The acrylic acid esters are exemplified by compounds having the formula $R^3$—O—C(O)—$CR^4$=$CHR^5$ wherein $R^3$ is selected from the group consisting of alkyl groups having from 1 to 30 carbon atoms, arylalkyl groups having from 1 to 30 carbon atoms, alkoxyalkyl groups having from 1 to 30 carbon atoms, and hydroxyalkyl groups having from 1 to 30 carbon atoms, $R^4$ and $R^5$ are independently selected from the group consisting of hydrogen, an alkyl group having from 1 to 8 carbon atoms, an alkoxy group having from 1 to 8 carbon atoms, an alkoxyalkyl group having from 1 to 8 carbon atoms, and a hydroxyalkoxy group having from 1 to 8 carbon atoms. The alkyl groups, arylalkyl groups, alkoxy groups, and hydroxyalkyl groups of $R^3$ can be straight chain, branched chain or cyclic, and may be substituted with one or more halogen atoms such as fluorine or chlorine.

The alkyl groups of $R^3$ are exemplified by methyl, ethyl, propyl, butyl, hexyl, octyl, decyl, dodecyl, tetradecyl, hexadecyl, octadecyl, isobornyl, $—C_{20}H_{41}$, $—C_{22}H_{45}$, $—C_{24}H_{49}$, $—C_{26}H_{53}$, $—C_{28}H_{57}$, and $—C_{30}H_{61}$. The arylalkyl groups of $R^3$ are exemplified by alkyl groups as defined above substituted with one or more aryl groups exemplified by phenyl. The alkoxyalkyl groups of $R^3$ are exemplified by alkyl groups as defined above substituted with one or more alkoxy groups exemplified by methoxy, ethoxy, and phenoxy. The hydroxyalkyl groups of $R^3$ are exemplified by alkyl groups as defined above substituted with one or more hydroxy (—OH) groups.

The alkyl groups of $R^4$ and $R^5$ are exemplified by methyl, ethyl, propyl, butyl, hexyl, and octyl. The alkoxy groups of $R^4$ and $R^5$ are exemplified by methoxy and ethoxy. The alkoxyalkyl groups of $R^4$ and $R^5$ are exemplified by 2-methoxyethyl and 2-ethoxyethyl. The hydroxyalkoxy groups of $R^4$ and $R^5$ are exemplified by 2-hydroxyethoxy.

The acrylic acid esters are exemplified by methyl acrylate, ethyl acrylate, butyl acrylate, isobutyl acrylate, methylbutyl acrylate, ethylbutyl acrylate, dimethylbutyl acrylate, propyl acrylate, isopropyl acrylate, pentyl acrylate, hexyl acrylate, heptyl acrylate, methylpentyl acrylate, octyl acrylate, dimethyloctyl acrylate, 2-ethylhexyl acrylate, nonyl acrylate, decyl acrylate, isodecyl acrylate, dodecyl acrylate, tetradecyl acrylate, tridecyl acrylate, hexadecyl acrylate, octadecyl acrylate, 2-phenylethyl acrylate, 1,1,1-trifluoroethyl acrylate, benzyl acrylate, cyclohexyl acrylate, 1,1-dihydroperfluorohexyl acrylate, 1,1-dihydroperfluorodecyl acrylate, 1,1-dihydroperfluoropentyl acrylate, heptafluorobutyl acrylate, hydroxypropyl acrylate, methoxybutyl acrylate, phenoxyethyl acrylate, isobornyl acrylate, methyl methacrylate, ethyl methacrylate, propyl methacrylate, isopropyl methacrylate, n-butyl methacrylate, isobutyl methacrylate, sec-butyl methacrylate, t-butyl methacrylate, n-hexyl methacrylate, n-octyl methacrylate, isooctyl methacrylate, 2-ethylhexyl methacrylate, n-decyl methacrylate, tetradecyl methacrylate, 2-ethylhexyl ethacrylate, and mixtures thereof. Preferred acrylic acid esters are selected from the group consisting of methyl acrylate, ethyl acrylate, butyl acrylate, 2-ethylhexyl acrylate, hexyl acrylate, ethylbutyl acrylate, nonyl acrylate, tetradecyl acrylate, hexadecyl acrylate, octadecyl acrylate, isobornyl acrylate, hydroxypropyl acrylate and mixtures thereof, with methyl acrylate being especially preferred.

The vinyl esters are exemplified by vinyl acetate. The copolymers of this invention formed by utilizing the vinyl ester can then subsequently hydrolyzed to various degrees to form a backbone component having varying degrees of polyvinylalcohol.

The N-alkyl acrylamides are exemplified by N-octyl acrylamide, N-octyl methacrylamide, N-octyl ethacrylamide, N,N-dimethyl acrylamide, N,N-dimethyl methacrylamide, N-(2-ethylhexyl) acrylamide, N-hexadecyl acrylamide, N,N-methylpropyl acrylamide, N,N-methylpropyl methacrylamide, and mixtures thereof.

The alkyl vinyl ethers are exemplified by ethyl vinyl ether, decyl vinyl ether, hexadecyl vinyl ether, hexyl vinyl ether, isobutyl vinyl ether, isopropyl vinyl ether, octyl vinyl ether, propyl vinyl ether, s-butyl vinyl ether, and mixtures thereof.

The alkyl substituted styrenes are exemplified by 4-nonyl styrene, 4-octyl styrene, 4-(2-ethylhexyl) styrene, 3-octyl styrene, 2-octyl styrene, 4-isobutyl styrene, 3,5-dimethyl styrene, 2-methyl-4-isopropyl styrene, and mixtures thereof.

It is preferred for purposes of this invention that component (A) is an acrylic acid ester as described above.

Generally, component (A), the ethylenically unsaturated monomer, is present in an amount of from about 10 to about 99.8 weight percent (wt %), and preferably from 20 to 60 wt %, said wt % being based on the total weight of the copolymer.

The polybutylene chain of (B) can comprise repeat units having the following formulas

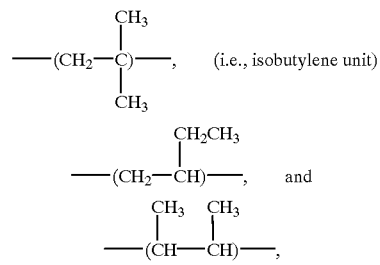

as well as rearranged products such as $—(CH_2CH_2CH_2CH_2)—$ and

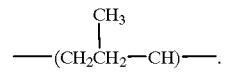

The preferred component (B) is an oligomer or polymer wherein a predominant proportion of the repeat units are isobutylene units and which has a number average molecular weight of about 200 to 200,000, preferably about 200 to 2,000.

In formulas (i)–(xix), the alkylene groups of G are exemplified by ethylene, $—CH_2CH(CH_3)—$, propylene, butylene, pentylene, trimethylene, 2-methyltrimethylene, pentamethylene, hexamethylene, 3-ethyl-hexamethylene, octamethylene, and decamethylene. The alkylene groups of G' are exemplified by methylene, ethylene, $—CH_2CH(CH_3)—$, propylene, butylene, pentylene, trimethylene, 2-methyltrimethylene, pentamethylene, hexamethylene, 3-ethyl-hexamethylene, octamethylene, and decamethylene.

The alkyl groups of L in formulas (i)–(xix) are exemplified by methyl, ethyl, propyl, butyl, hexyl, octyl, decyl, dodecyl, tetradecyl, hexadecyl, and octadecyl. Preferably L is selected from the group consisting of hydrogen and methyl. The group R' is exemplified by methyl, ethyl, propyl, butyl, and hexyl.

Preferably the acryl-terminated, carboxyl-functional polybutylene macromonomer is selected from the group consisting of

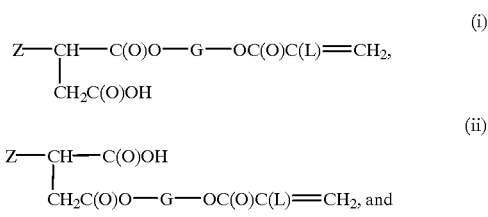

(iii) a mixture of (i) and (ii), wherein Z, G, and L are defined as described above.

Generally, component (B), the acryl-terminated, carboxyl-functional polybutylene macromonomer, is present in amount from about 0.1 to about 90 wt %, and preferably from 5 to 70 wt %, said wt % being based on the total weight of the copolymer.

Component (C), the acryloxy-functional polydiorganosiloxane macromonomer is exemplified by acryloxyalkyl-functional organopolysiloxanes having the formula:

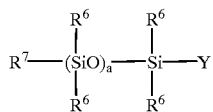

wherein $R^6$ is an alkyl group having from 1 to 18 carbon atoms, $R^7$ is an alkyl group having from 1 to 10 carbon atoms, a has a value of at least 1, preferably at least 3, and more preferably at least 10, and Y is a group having the formula —$R^9$—O—C(O)—$CR^8$=$CH_2$ wherein $R^8$ is selected from the group consisting of hydrogen and an alkyl group having from 1 to 18 carbon atoms and $R^9$ is an alkylene group having from 1 to 10 carbon atoms.

The alkyl groups of $R^6$, $R^7$, and $R^8$ are as described above including preferred embodiments thereof. The alkylene groups of $R^9$ are as described above including preferred embodiments thereof. Preferably, $R^6$ is methyl, $R^7$ is selected from the group consisting of methyl, ethyl, propyl, n-butyl, sec-butyl, and tert-butyl, $R^8$ is hydrogen or methyl, and $R^9$ is selected from the group consisting of ethylene, propylene, and butylene. Preferably a has a value of from 10 to 300.

Generally, component (C), the acryloxy-functional organopolysiloxane macromonomer, is present in an amount from about 0.1 to about 90 wt %, and preferably from 0.1 to 40 wt %, said wt % being based on the total weight of the copolymer.

Particularly preferred polymers are exemplified by (the weight percents below refer to the amount of reactants added in the polymerization reaction, not necessarily the amount in the finished polymer): 50 wt % methyl acrylate/30 wt % acryl-terminated, carboxyl-functional polybutylene macromonomer/20 wt % acryloxyalkyl-functional polydimethylsiloxane macromonomer; 10 wt % methyl acrylate/70 wt % acryl-terminated, carboxyl-functional polybutylene macromonomer/20 wt % acryloxyalkyl-functional polydimethylsiloxane macromonomer; 50 wt % methyl acrylate/30 wt % acryl-terminated, carboxyl-functional polybutylene macromoriomer/20 wt % acryloxyalkyl-functional polydimethylsiloxane macromonomer; and 10 wt % methyl acrylate/ 70 wt % acryl-terminated, carboxyl-functional polybutylene macromonomer/20 wt % acryloxyalkyl-functional polydimethylsiloxane macromonomer.

The graft copolymers of this invention can be prepared by free radical polymerization of monomer (A) with macromonomers (B) and (C). It is not intended to necessarily exclude from this invention any copolymers made by means other than free radical polymerization, so long as the product has the desired physical properties. The graft copolymers herein are formed from randomly repeating ethylenically unsaturated monomer units, acryl-terminated, carboxyl-functional polybutylene units, and acryloxyalkyl-functional polydimethylsiloxane units.

This invention further relates to a method of making graft copolymers comprising randomly repeating ethylenically unsaturated monomer units, acryl-terminated, carboxyl-functional polybutylene units, and acryloxyalkyl-functional polydimethylsiloxane units, the method comprising (I) heating a mixture comprising (A) at least one ethylenically unsaturated monomer, (B) an acryl-terminated, carboxyl-functional polybutylene macromonomer having a formula selected from the group consisting of

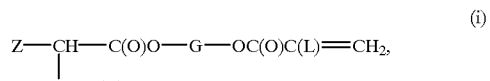

(i)

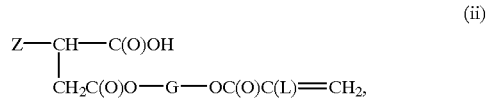

(ii)

(iii) a mixture of (i) and (ii),

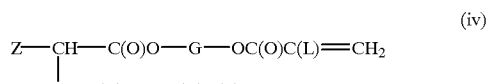

(iv)

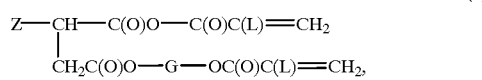

(v)

(vi) a mixture of (iv) and (v),

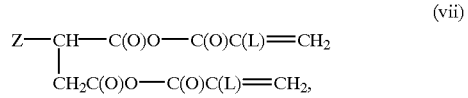

(vii)

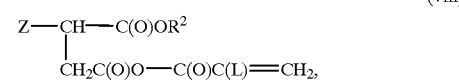

(viii)

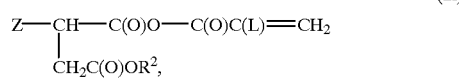

(ix)

(x) a mixture of (viii) and (ix),

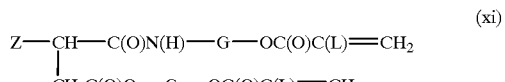

(xi)

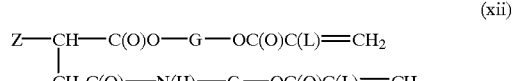

(xii)

(xiii) a mixture of (xi) and (xii),

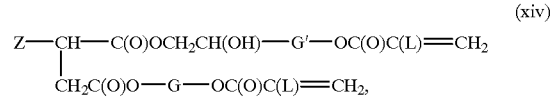

(xiv)

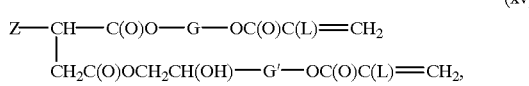

(xv)

(xvi) a mixture of (xiv) and (xv),

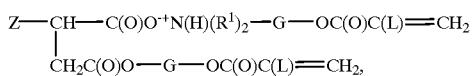

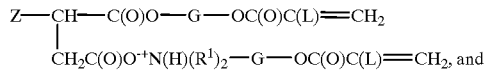

(xix) a mixture of (xvii) and (xviii)
wherein Z represents a polybutylene chain, G is independently an alkylene group having 2 to 10 carbon atoms, G' is independently an alkylene group having from 1 to 10 carbon atoms, L is independently selected from the group consisting of hydrogen and an alkyl group having from 1 to 18 carbon atoms, $R^2$ is selected from the group consisting of methyl, ethyl, and propyl, and $R^1$ is independently an alkyl radical having from 1 to 6 carbon atoms, and (C) an acryloxyalkyl-functional polydiorganosiloxane macromonomer, and (D) an initiator.

Components (A)–(C) are as described hereinabove including preferred embodiments and amounts thereof. Component (D) in this invention is an initiator. Preferably component (D) is a free radical initiator exemplified by peroxide initiators, azo initiators, redox intitiators, and photochemical initiators. The peroxide initiators are exemplified by diacyl peroxides, peroxyesters, dialkyl peroxides, and peroxydicarbonates. Especially preferred peroxide initiators are exemplified by dibenzoyl peroxide, t-butyl peroctoate, dicumyl peroxide, diisopropyl peroxydicarbonate, and a preferred azo initiator is 2,2-azobisisobutyronitrile.

Generally, component (D), the initiator, is present in an amount from about 0.05 to about 5 wt %, and preferably from 0.1 to 1 wt %, said wt % being based on the total weight of the formulation.

If the copolymers of this invention are produced by solution polymerization then the mixture can further comprise (E), a solvent, which is exemplified by aliphatic hydrocarbons such as pentane, hexane, heptane, octane, and nonane, aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more solvents may be used together. The solvent is preferably selected from the group consisting of benzene, toluene, and xylene.

The amount of solvent is not critical and may be readily determined by one skilled in the art. Generally, component (E), the solvent, is present in an amount of up to 1000 parts by weight, and preferably from 100 to 300 parts by weight, per 100 parts by weight of components (A)–(D).

If the copolymers of this invention are produced by emulsion polymerization then the mixture can further comprise (E'), at least one surfactant and water, and the surfactants are exemplified by (i) at least one anionic surfactant, (ii) at least one nonionic surfactant, (iii) at least one cationic surfactant, a mixture of (i) and (ii), and a mixture of (ii) and (iii).

The anionic surfactants may be selected from any anionic surfactant known in the art as useful in emulsion polymerization. Examples of suitable anionic surfactants include alkali meal sulforicinates, sulfonated glyceryl esters of fatty acids such as sulfonated monoglycerides of coconut oil acids, salts of sulfonated monovalent alcohol esters such as sodium oleylisethionate, amides of amino sulfonic acids such as the sodium salt of oleyl methyl tauride, sulfonated products of fatty acids nitriles such as palmitonitrile sulfonate, sulfonated aromatic hydrocarbons such as sodium alkyl-naphthalene monosulfonate, condensation products of naphthalene sulfonic acids with formaldehyde, sodium octahydroanthracene sulfonate, alkali metal alkyl sulfates such as ammonium lauryl sulfate or triethanol amine lauryl sulfate, ether sulfates having alkyl groups of 8 or more carbon atoms such as sodium lauryl ether sulfate or sodium alkyl aryl ether sulfates, alkylarylsulfonates having 1 or more alkyl groups of 8 or more carbon atoms, alkylbenzenesulfonic acids which are exemplified by hexylbenzenesulfonic acid, octylbenzenesulfonic acid, decylbenzenesulfonic acid, dodecylbenzenesulfonic acid, cetylbenzenesulfonic acid, and myristylbenzenesulfonic acid, salts of alkylbenzenesulfonic acids, alkyltoluenesulfonic acids, alkylxylenesulfonic acids, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid.

Anionic surfactants commercially available and useful in the instant invention are exemplified by dodecylbenzenesulfonic acid sold under the name Biosoft® S-100 by Stepan Co. and related salts such as the sodium salt of dodecylbenzensulfonic acid sold under the name Siponate™ DS-10 by Alcolac Inc.

Nonionic surfactants useful in the method of the instant invention are those that have a hydrophilic-lipophilic balance (HLB) between 10 and 20. Nonionic surfactants with an HLB of less than 10 may be used in the instant invention, however, a hazy solution may result due to the limited solubility of the nonionic surfactant in water. It is preferred that when using a nonionic surfactant with an HLB of less than 10, that a nonionic surfactant with an HLB of greater than 10 also be added during or after polymerization. The preferred nonionic surfactants are those which are stable in the polymerization environment.

Examples of suitable nonionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene oxide-polypropylene oxide block copolymers, diethylene glycol, ethoxylated trimethylnonanols, and polyoxyalkylene glycol modified polysiloxane surfactants. Mixtures of nonionic surfactants may also be employed.

Preferred nonionic surfactants are exemplified by 2,6,8 trimethyl-4-nonyloxypolyethyleneoxyethanol (6EO) (sold as Tergitol® TMN-6 by Union Carbide Corp., Danbury, Conn. 06817), 2,6,8-trimethyl-4-nonyloxypolyethyleneoxyethanol (10EO) (sold as Tergitol® TMN-10 by Union Carbide Corp., Danbury, Conn. 06817), alkyleneoxypolyethyleneoxyethanol (C11-15, secondary alkyl, 7EO) (sold as Tertitol® 15-S-7 by Union Carbide Corp., Danbury, Conn. 06817), alkyleneoxypolyethyleneoxyethanol (C11-15, secondary alkyl, 9EO) (sold as Tergitol® 15-S-9 by Union Carbide Corp., Danbury, Conn. 06817), alkyleneoxypolyethyleneoxyethanol (C11-15, secondary alkyl, 15EO) (sold as Tergitol® 15-S-15 by Union Carbide Corp., Danbury, Conn. 06817), octylphenoxypolyethoxyethanol (40EO) (sold as Triton® X405 by Rohm and Haas Co., Philadelphia, Pa.), nonylphenoxypolyethoxyethanol (10EO) (sold as Makon™ 10 by Stepan Co.), and polyoxyethylene-23-lauryl ether (sold as Brij® 35L by ICI Americas, Inc., Wilmington, Del. 19897).

Examples of suitable cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such as undecylimidazoline, fatty amides derived from disubstituted amines such as oleylalminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, or hexactecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmityl hydroxyethylammonium methosulfate, amide derivatives of amino alcohols such as beta-hydroxylethylstearylamide, and amine salts of long chain fatty acids.

The amount of surfactant(s) and water is not critical and may be readily determined by one skilled in the art. Generally, component (E'), the surfactant(s) and water, is present in an amount of up to 1000 parts by weight, and preferably from 100 to 300 parts by weight, per 100 parts by weight of components (A)–(D).

If the copolymers of this invention are produced by dispersion polymerization then the mixture can further comprise (E"), at least one dispersant and water, and the dispersants are exemplified by water soluble organic polymers such as carboxymethyl cellulose, gelatin, gum agar, polyvinyl alcohol, polyacrylic acid, polymethacrylic acid, hydroxy propylmethyl cellulose, methyl cellulose, colloidal silica, and colloidal clay.

The amount of dispersant and water is not critical and may be readily determined by one skilled in the art. Generally, component (E"), the dispersant(s) and water, is present in an amount of up to 1000 parts by weight, and preferably from 100 to 300 parts by weight, per 100 parts by weight of components (A)–(D).

If the copolymers of this invention are produced by suspension polymerization then the mixture can further comprise (E'''), at least one suspending agent and water, and the suspending agents are exemplified by water insoluble inorganic dispersants such as hydroxyapatite, barium sulfate, kaolin, and magnesium silicates.

The amount of suspending agent(s) and water is not critical and may be readily determined by one skilled in the art. Generally, component (E'''), the suspending agent(s) and water, is present in an amount of up to 1000 parts by weight, and preferably from 100 to 300 parts by weight, per 100 parts by weight of components (A)–(D).

The method of this invention can further comprise adding a base compound to the product of step (I) when component (A) is a vinyl ester. The base compound is exemplified by sodium hydroxide, potassium hydroxide, and ammonium hydroxide.

The temperature at which the mixture of components (A)–(D) and optionally (E) is heated is dependent on the type of catalyst that is selected. However, it is preferred for purposes of this invention that the mixture of components (A)–(D) and optionally (E) is heated at a temperature of at least 50° C. and preferably from about 50° C. to about 100° C.

The general principles of free radical polymerization methods are well understood by those skilled in the art. The desired monomer(s) and macromonomers are all placed in a reactor along with a sufficient amount of a mutual solvent so that when the reaction is complete the viscosity of the reaction is reasonable. Undesired terminators or inhibitors, such as oxygen, can be removed as needed. This is done by evacuation or by purging with an inert gas, such as argon or nitrogen. The initiator is introduced and the reaction brought to the temperature needed for initiation to occur, assuming thermal initiators are used. The polymerization is allowed to proceed as long as needed for a high level of conversion to be achieved, typically from a few hours to a few days. The solvent is then removed, usually by evaporation or by precipitating the copolymer by addition of a non-solvent. The copolymer can be further purified, as needed utilizing a variety of techniques including filtration, extraction, trituration, membrane separation, and gel permeation chromatography.

There are numerous variations on these procedures which are entirely up to the discretion of the formulator, for example, the choice of degassing method and gas, choice of initiator type, extent of conversion, reaction loading etc. The choice of initiator and solvent are often determined by the requirements of the particular monomers and macromonomers used, because different monomers and macromonomers have different solubilities and different reactivities with a specific initiator.

The graft copolymers of this invention can also be prepared by first preparing the backbone and polydiorganosiloxane side chains from the copolymerization of suitable ethylenically unsaturated monomers and acryloxyalkyl-functional polydiorganosiloxane macromonomers, followed by further polymerization of the resulting intermediary copolymer with suitable polybutylene macromonomers to form the side chains. In yet another alternative method, the polydiorganosiloxane side chain can be added by polymerizing siloxane-containing moieties onto an intermediate copolymer prepared from suitable monomers and a polybutylene macromonomer.

Analysis of the copolymer reaction product, the extracted materials, and the purified graft copolymer can be performed by conventional analysis techniques known in the art. These include, for example nuclear magnetic resonance (NMR), infrared molecular spectroscopies, gel permeation/size exclusion chromatography, membrane osmometry, and atomic absorption, and emission spectroscopies.

The carboxyl-functionality on the polybutylene macromonomer is useful when copolymerized with polydiorganosiloxane macromonomer and other organic monomers and also serves as a site for crosslinking. The polybutylene functions to reduce the water vapor peimeability of the copolymer. Typical crosslinkers include melamine resins, isocyanates, zinc oxide, diamines, and organofunctional silanes such as N-(beta-aminoethyl)-gamma-aminopropyltrimethoxysilane.

The carboxyl-functional group on the polybutylene macromonomer can also be neutralized with base to render the copolymer water or alcohol soluble or dispersible. The graft copolymer can also act as a dispersing agent or polymeric surfactant.

The carboxyl-functionality on the polybutylene macromonomer can also aid adhesior to metal, wood, and paper substrates.

EXAMPLES

Example 1

Synthesis of Methacryloxy Endcapped Polydimethylsiloxane Macromonomer

Anionic polymerizations were carried out in rigorously cleaned and dried 3-necked round-bottom flasks equipped with a stirrer and condenser under 6 psig purified nitrogen atmosphere. A 2025 g xylene solution of a cyclic siloxane (1350 g) having the formula $((CH_3)_2SiO_{2/2})_3$, was added into the flask with a syringe. A calculated amount (76 mL) of 1.6 M n-butyl lithium was added to initiate the ring-opening polymerization. 135 g of DMF (dimethyl formamide) was added next. The reaction was allowed to proceed for about 2 hours at 24° C. The polymerization was allowed to proceed for about 2 hours at 24° C. The polymerization was terminated by the addition of 30 g of 3-(methacryloxypropyl)dimethylchlorosilane (MAPDCS) to afford the macromonomer. The solution was filtered and devolatilized to produce a macromonomer with a number average raolecular weight (Mn) of 10,000 (denoted hereinafter as Polydimethylsiloxane Macromonomer A).

A second methacryloxy endcapped poly (dimethylsiloxane) macromonomer was prepared according to the procedure outlined above and this produced a macromonomer having an Mn of 5,000 (denoted hereinafter as Polydimethylsiloxane Macromonomer B).

Example 2

Synthesis of Acryloxy Endcapped Polyisobutylene Macromonomer

A polyisobutylene macromonomer was prepared according to Example 1 of U.S. Pat. No. 5,665,828. The polyisobutylene macromonomer is a mixture of (i) a compound having the formula:

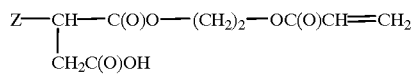

and (ii) a compound having the formula

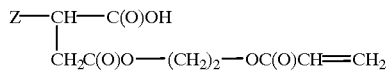

wherein Z denotes a polyisobutylene chain, wherein the polyisobutylene macromonomer has a number average molecular weight of about 1,100 (denoted hereinafter as Polybiutylene Macromonomer).

Example 3

Synthesis of poly(methyl acrylate)-graft-polydimethylsiloxane

To a solution of 240.31 g of methyl acrylate and 60.07 g of Polydimethylsiloxane Macromonomer A in 910 g of toluene was added 1.53 g of AIBN initiator. The resulting solution was heated at 60° C. for 21 hours. The solution was poured into methanol to precipitate the copolymer. The copolymer was dried under reduced pressure at 80° C. for 20 hours to yield 270.1 g. The resulting copolymer contained the following weight percentages of monomers and macromonomers: 80 wt % methyl acrylate/20 wt % Polydimethylsiloxane Macromonomer A.

Example 4

Synthesis of poly(methyl acrylate)-graft-(polybutylene-polydimethylsiloxane)

To a solution containing 33.40 g of methyl acrylate, 13.39 g of Polydimethylsiloxane Macromonomer A, and 20.08 g of Polyisobutylene Macromonomer in 261 g of toluene was added 0.33 g of AIBN initiator. The resulting solution was heated at 60° C. for 20 hours. The solution was poured into methanol to precipitate the copolymer. The copolymer was dried under reduced pressure at 80° C. for 16 hours to yield 56.60 g. The resulting copolymer contained the following weight percentages of monomers and macromonomers: 50 wt % methyl acrylate/30 wt % Polyisobutylene Macromonomer/20 wt % Polydimethylsiloxane Macromonomer A.

Example 5

Synthesis of poly(methyl acrylate)-graft-(polybutylene-polydimethylsiloxane)

To a solution of 5.10 g of methyl acrylate, 10.02 g of Polydimethylsiloxane Macromonomer A, and 35.11 g of Polyisobutylene Macromonomer in 266 g of toluene was added 0.26 g of AIBN initiator. The resulting solution was heated at 60° C. for 22 hours. The solution was poured into methanol to precipitate the copolymer. The copolymer was dried under reduced pressure at 80° C. for 16 hours to yield 44.64 g. The resulting copolymer contained the following weight percentages of monomers and macromonomers: 10 wt % methyl acrylate/70 wt % Polyisobutylene Macromonomer/20 wt % Polydimethylsiloxane Macromonomer A.

Example 6

Synthesis of poly(methyl acrylate)-graft-(polybutylene-polydimethylsiloxane)

To a solution of 50.01 g of methyl acrylate, 20.06 g of Polydimethylsiloxane Macromonomer B, and 30.11 g of Polyisobutylene Macromonomer in 409 g of toluene was added 0.51 g of AIBN initiator. The resulting solution was heated at 60° C. for 21 hours. The solution was poured into methanol to precipitate the copolymer. The copolymer was dried under reduced pressure at 80° C. for 16 hours to yield 71.24 g. The resulting copolymer contained the following weight percentages of monomers and macromonomers: 50 wt % methyl acrylate/30 wt % Polyisobutylene Macromonomer/20wt % Polydimethylsiloxane Macromonomer B.

Example 7

Synthesis of poly(methyl acrylate)-graft-(polybutylene-polydimethylsiloxane)

To a solution of 5.03 g of methyl acrylate, 10.03 g of Polydimethylsiloxane Macromonomer B, and 35.12 g of Polyisobutylene Macromonomer in 279 g of toluene was added 0.25 g of AIBN initiator. The resulting solution was heated at 60° C. for 18 hours. The solution was poured into methanol to precipitate the copolymer. The copolymer was dried under reduced pressure at 80° C. for 16 hours to yield 43.16 g. The resulting copolymer contained the following weight percentages of monomers and macromonomers: 10 wt % methyl acrylate/70 wt % Polyisobutylene Macromonomer/20 wt % Polydimethylsiloxane Macromonomer B.

TABLE 1

Copolymer Compositions

| Monomer | EXAMPLE 4 | EXAMPLE 5 | EXAMPLE 6 | EXAMPLE 7 | EXAMPLE 3 |
|---|---|---|---|---|---|
| PDMS Macromonomer A (MW = 10000) | 20 | 20 | — | — | 20 |
| PDMS Macromonomer B (MW = 5000) | — | — | 20 | 20 | — |
| Methyl Acrylate | 50 | 10 | 50 | 10 | 80 |
| PIB Macromonomer (MW = 1100) | 30 | 70 | 30 | 70 | — |

*PDMS denotes Polydimethylsiloxane
*PIB denotes Polyisobutylene

Water Vapor Permeation

Water vapor permeation was measured on a Mocon Permtran-W 3/31 Water Vapor Permeation Analysis System. The films of Examples 3, 4, and 6 were tested at 85–90% relative humidity. Film thicknesses were all between 12 and 14 mils. The water vapor permeation rates given are equilibrium values. The results are shown in Table 2 below.

TABLE 2

| Example | Thickness (mils) | Wt % PIB Macromonomer | MW of PDMS Macromonomer | Water Vapor Permeation (g/m$^2$/day) |
|---|---|---|---|---|
| 3 | 12 | 0 | 10,000 | 108 |
| 4 | 13.6 | 30 | 10,000 | 35 |
| 6 | 12 | 30 | 5,000 | 41 |

Water Repellency

The water repellency of the films of Examples 3–7 were measured using a water uptake test. The films were cut to 1 inch×1 inch and film thicknesses were all between 14 and 24 mils. Films were first weighed, then immersed in deionized water and re-weighed at specified time intervals. The difference between initial film weight and weight at specified time intervals is given as % water uptake. Films with lower % water uptake are considered to be more water repellent. The results are shown in Table 3 below.

TABLE 3

| Time (hrs) | Water Uptake (%) |
|---|---|
| Example 3 | |
| 0 | 0 |
| 1 | 0.44 |
| 2 | 0.51 |
| 3 | 0.6 |

TABLE 3-continued

| Time (hrs) | Water Uptake (%) |
|---|---|
| 4 | 0.63 |
| 5 | 0.59 |
| 6 | 0.65 |
| 24 | 0.75 |
| 72 | 0.77 |
| 96 | 0.95 |
| 172 | 1.01 |
| Example 6 | |
| 0 | 0 |
| 1 | 0.44 |
| 2 | 0.57 |
| 3 | 0.69 |
| 4 | 0.68 |
| 5 | 0.72 |
| 6 | 0.72 |
| 24 | 0.8 |
| 72 | 0.85 |
| 96 | 0.99 |
| 172 | 1.06 |
| Example 4 | |
| 0 | 0 |
| 1 | 0.57 |
| 2 | 0.67 |
| 3 | 0.79 |
| 4 | 0.82 |
| 5 | 0.87 |
| 6 | 0.88 |
| 24 | 0.95 |
| 72 | 1.07 |
| 96 | 1.17 |
| 172 | 1.33 |
| Example 7 | |
| 0 | 0 |
| 1 | 0.02 |
| 2 | 0 |
| 3 | 0 |
| 4 | 0.13 |
| 5 | 0.06 |
| 6 | 0.03 |
| 24 | 0.16 |
| 72 | 0.35 |
| 96 | 0.39 |
| 172 | 0.5 |
| Example 5 | |
| 0 | 0 |
| 1 | 0.44 |
| 2 | 0.57 |
| 3 | 0.69 |
| 4 | 0.68 |
| 5 | 0.72 |
| 6 | 0.72 |
| 24 | 0.8 |
| 72 | 0.85 |
| 96 | 0.99 |
| 172 | 1.06 |
| 172 | 0.9 |

The dimensional stability of films cast from the terpolymers of this invention were visibly better than the methyl acrylate-graft-silicone copolymer control or the poly(methyl acrylate) control. After submerging the films in water for 172 hours, the polyisobutylene-containing polymer films were perfectly flat, whereas the other films were curled and wrinkled.

What is claimed is:

1. A graft copolymer comprising a backbone and at least two polymeric side chains, the graft copolymer formed from the copolymerization of randomly repeating ethylenically unsaturated monomer units, acryloxyalkyl-functional polydiorganosiloxane macromonomer units, and acryl-terminated, carboxyl-functional polybutylene macromonomer units, wherein the copolymer comprises:

(A) at least one ethylenically unsaturated monomer;

(B) at least one acryl-terminated, carboxyl-functional polybutylene macromonomer having its formula selected from the group consisting of (i)
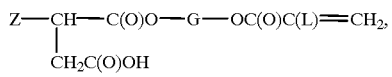

(ii)
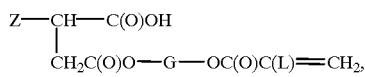

(iii) a mixture of (i) and (ii), (iv)
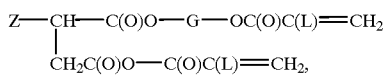

(v)
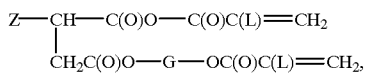

(vi) a mixture of (iv) and (v), (vii)
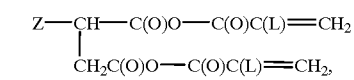

(viii)
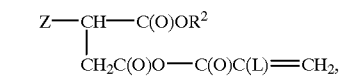

(ix)
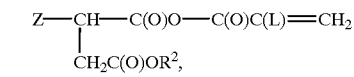

(x) a mixture of (viii) and (ix), (xi)
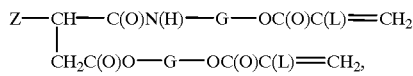

(xii)
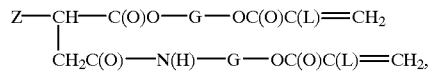

(xiii) a mixture of (xi) and (xii), (xiv)
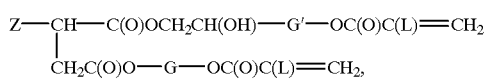

(xv)
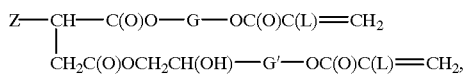

(xvi) a mixture of (xiv) and (xv), (xvii)
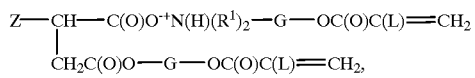

(xviii)
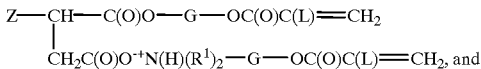

(xix) a mixture of (xvii) and (xviii)

wherein Z represents a polybutylene chain, G is independently an alkylene group having 2 to 10 carbon atoms, G' is independently an alkylene group having from 1 to 10 carbon atoms, L is independently selected from the group consisting of hydrogen and an alkyl group having from 1 to 18 carbon atoms, $R^2$ is selected from the group consisting of methyl, ethyl, and propyl, and $R^1$ is independently an alkyl radical having from 1 to 6 carbon atoms; and (C) at least one acryloxyalkyl-functional polydiorganosiloxane macromonomer, wherein the ethylenically unsaturated monomer units, in conjunction with the copolymerizable moieties of the acryloxyalkyl-functional polydiorganosiloxane macromonomer units and the acryl-terminated, carboxyl-functional polybutylene macromonomer units, form the backbone, and wherein the polymeric portion of the acryloxyalkyl-functional polydiorganosiloxane macromonomer units form at least one side chain and the polymeric portion of the acryl-terminated, carboxyl-functional polybutylene macromonomer units form at least one side chain.

2. A graft copolymer according to claim 1, wherein (A) is selected from the group consisting of acrylic acid esters, vinyl esters, N-alkyl acrylamides, alkyl vinyl ethers, alkyl substituted styrenes, acrylonitrile.

3. A graft copolymer according to claim 2, wherein the acrylic acid esters are compounds having the formula $R^3-O-C(O)-CR^4=CHR^5$ wherein $R^3$ is selected from the group consisting of alkyl groups having from 1 to 30 carbon atoms, arylalkyl groups having from 1 to 30 carbon atoms, alkoxyalkyl groups having from 1 to 30 carbon atoms, and hydroxyalkyl groups having from 1 to 30 carbon atoms, $R^4$ and $R^5$ are independently selected from the group consisting of hydrogen, an alkyl group having from 1 to 8 carbon atoms, an alkoxy group having from 1 to 8 carbon atoms, an alkoxyalkyl group having from 1 to 8 carbon atoms, and a hydroxyalkoxy group having from 1 to 8 carbon atoms.

4. A graft copolymer according to claim 2, wherein the acrylic acid esters are selected from the group consisting of methyl acrylate, ethyl acrylate, butyl acrylate, isobutyl acrylate, methylbutyl acrylate, ethylbutyl acrylate, dimethylbutyl acrylate, propyl acrylate, isopropyl acrylate, pentyl acrylate, hexyl acrylate, heptyl acrylate, methylpentyl acrylate, octyl acrylate, dimethyloctyl acrylate, 2-ethylhexyl acrylate, nonyl acrylate, decyl acrylate, isodecyl acrylate, dodecyl acrylate, tetradecyl acrylate, tridecyl acrylate, hexadecyl acrylate, octadecyl acrylate, 2-phenylethyl acrylate, 1,1,1-trifluoroethyl acrylate, benzyl acrylate, cyclohexyl acrylate, 1,1-dihydroperfluorohexyl acrylate, 1,1-dihydroperfluorodecyl acrylate, 1,1-dihydroperfluoropentyl acrylate, heptafluorobutyl acrylate, hydroxypropyl acrylate, methoxybutyl acrylate, phenoxyethyl acrylate, isobornyl acrylate, methyl methacrylate, ethyl methacrylate, propyl methacrylate, isopropyl methacrylate, n-butyl methacrylate, isobutyl methacrylate, sec-butyl methacrylate, t-butyl methacrylate, n-hexyl methacrylate, n-octyl methacrylate, isooctyl methacrylate, 2-ethylhexyl methacrylate, n-decyl methacrylate, tetradecyl methacrylate, 2-ethylhexyl ethacrylate, and mixtures thereof.

5. A graft copolymer according to claim 1, wherein (A) is methyl acrylate.

6. A graft copolymer according to claim 1, wherein G is selected from the group consisting of ethylene, —CH$_2$CH(CH$_3$)—, propylene, butylene, pentylene, trimethylene, 2-methyltrimethylene, pentamethylene, hexamethylene, 3-ethyl-hexamethylene, octamethylene, and decamethylene.

7. A graft copolymer according to claim 1, wherein G' is selected from the group consisting of methylene, ethylene, —CH$_2$CH(CH$_3$)—, propylene, butylene, pentylene, trimethylene, 2-methyltrimethylene, pentamethylene, hexamethylene, 3-ethyl-hexamethylene, octamethylene, and decamethylene.

8. A graft copolymer according to claim 1, wherein L is selected from the group consisting of hydrogen and methyl.

9. A graft copolymer according to claim 1, wherein R' is selected from the group consisting of methyl, ethyl, propyl, butyl, and hexyl.

10. A graft copolymer according to claim 1, wherein (B) is selected from the group consisting of

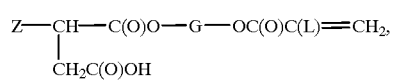
(i)

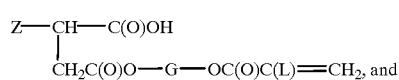
(ii)

(iii) a mixture of (i) and (ii),
wherein G is selected from the group consisting of ethylene, —CH$_2$CH(CH$_3$)—, propylene, butylene, pentylene, trimethylene, 2-methyltrimethylene, pentamethylene, hexamethylene, 3-ethyl-hexamethylene, octamethylene, and decamethylene and L is selected from the group consisting of hydrogen and methyl.

11. A graft copolymer according to claim 5, wherein (B) is selected from the group consisting of

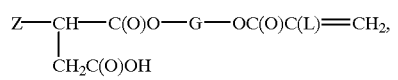
(i)

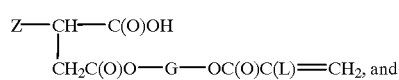
(ii)

(iii) a mixture of (i) and (ii),
wherein G is selected from the group consisting of ethylene, —CH$_2$CH(CH$_3$)—, propylene, butylene, pentylene, trimethylene, 2-methyltrimethylene, pentamethylene, hexamethylene, 3-ethyl-hexamethylene, octamethylene, and decamethylene and L is selected from the group consisting of hydrogen and methyl.

12. A graft copolymer according to claim 1, wherein (C) is an acryloxyalkyl-functional organopolysiloxane having the formula:

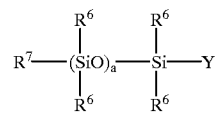

wherein R$^6$ is an alkyl group having from 1 to 18 carbon atoms, R$^7$ is an alkyl group having from 1 to 10 carbon atoms, a has a value of at least 1, and Y is a group having the formula —R$^9$—O—C(O)—CR$^8$=CH$_2$ wherein R$^8$ is selected from the group consisting of hydrogen and an alkyl group having from 1 to 18 carbon atoms and R$^9$ is an alkylene group having from 1 to 10 carbon atoms.

13. A graft copolymer according to claim 11, wherein (C) is an acryloxyalkyl-functional organopolysiloxane having the formula:

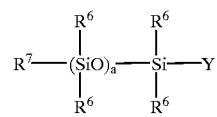

wherein R$^6$ is an alkyl group having from 1 to 18 carbon atoms, R$^7$ is an alkyl group having from 1 to 10 carbon atoms, a has a value of at least 1, and Y is a group having the formula —R$^9$—O—C(O)—CR$^8$=CH$_2$ wherein R$^8$ is selected from the group consisting of hydrogen and an alkyl group having from 1 to 18 carbon atoms and R$^9$ is an alkylene group having from 1 to 10 carbon atoms.

14. A graft copolymer according to claim 13, wherein R$^6$ is methyl, R$^7$ is selected from the group consisting of methyl, ethyl, propyl, n-butyl, sec-butyl, and tert-butyl, R$^8$ is hydrogen or methyl, R$^9$ is selected from the group consisting of ethylene, propylene, and butylene and a has a value of from 10 to 300.

15. A method of making graft copolymers comprising randomly repeating ethylenically unsaturated monomer units, acryl-terminated, carboxyl-functional polybutylene units, and acryloxyalkyl-functional polydimethylsiloxane units, the method comprising (I) heating a mixture comprising:

(A) at least one ethylenically unsaturated monomer;
(B) an acryl-terminated, carboxyl-functional polybutylene macromonomer having a formula selected from the group consisting of

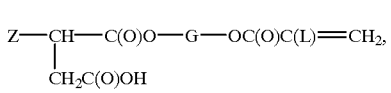
(i)

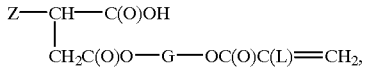
(ii)

(iii) a mixture of (i) and (ii),

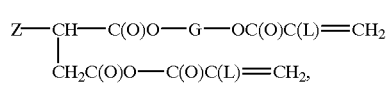
(iv)

-continued

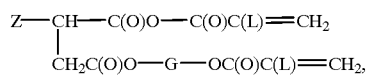 (v)

(vi) a mixture of (iv) and (v),

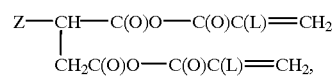 (vii)

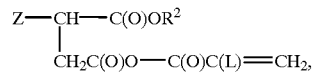 (viii)

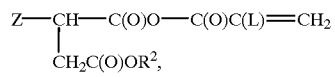 (ix)

(x) a mixture of (viii) and (ix),

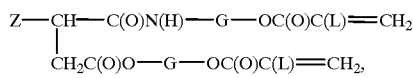 (xi)

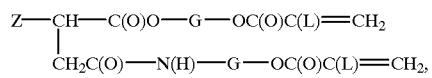 (xii)

(xiii) a mixture of (xi) and (xii),

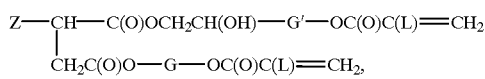 (xiv)

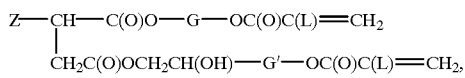 (xv)

(xvi) a mixture of (xiv) and (xv),

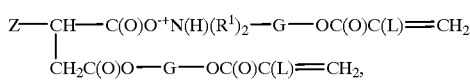 (xvii)

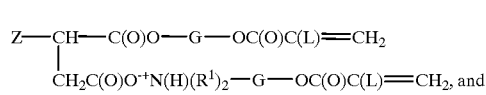 (xviii)

(xix) a mixture of (xvii) and (xviii)
wherein Z represents a polybutylene chain, G is independently an alkylene group having 2 to 10 carbon atoms, G' is independently an alkylene group having from 1 to 10 carbon atoms, L is independently selected from the group consisting of hydrogen and an alkyl group having from 1 to 18 carbon atoms, $R^2$ is selected from the group consisting of methyl, ethyl, and propyl, and $R^1$ is independently an alkyl radical having from 1 to 6 carbon atoms, and (C) an acryloxyalkyl-functional polydiorganosiloxane macromonomer, and (D) an initiator.

16. A method according to claim 15, wherein (A) is methyl acrylate.

17. A method according to claim 16, wherein (B) is selected from the group consisting of

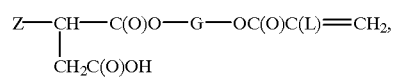 (i)

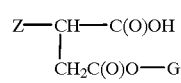 (ii)

and (iii) a mixture of (i) and (ii),
wherein G is selected from the group consisting of ethylene, —CH$_2$CH(CH$_3$)—, propylene, butylene, pentylene, trimethylene, 2-methyltrimethylene, pentamethylene, hexamethylene, 3-ethylhexamethylene, octamethylene, and decamethylene and L is selected from the group consisting of hydrogen and methyl.

18. A method according to claim 17, wherein (C) is an acryloxyalkyl-functional organopolysiloxane having the formula:

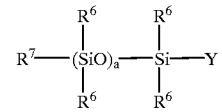

wherein $R^6$ is an alkyl group having from 1 to 18 carbon atoms, $R^7$ is an alkyl group having from 1 to 10 carbon atoms, a has a value of at least 1, and Y is a group having the formula —$R^9$—O—C(O)—C$R^8$=CH$_2$ wherein $R^8$ is selected from the group consisting of hydrogen and an alkyl group having from 1 to 18 carbon atoms and $R^9$ is an alkylene group having from 1 to 10 carbon atoms.

19. A method according to claim 18, wherein $R^6$ is methyl, $R^7$ is selected from the group consisting of methyl, ethyl, propyl, n-butyl, sec-butyl, and tert-butyl, $R^8$ is hydrogen or methyl, $R^9$ is selected from the group consisting of ethylene, propylene, and butylene and a has a value of from 10 to 300.

20. A method according to claim 15, wherein (D) is selected from the group consisting of dibenzoyl peroxide, t-butyl peroctoate, dicumyl peroxide, diisopropyl peroxydicarbonate, and 2,2-azobisisobutyronitrile.

21. A method according to claim 18, wherein (D) is selected from the group consisting of dibenzoyl peroxide, t-butyl peroctoate, dicumyl peroxide, diisopropyl peroxydicarbonate, and 2,2-azobisisobutyronitrile.

22. A method according to claim 15, wherein the mixture further comprises (E) a solvent.

23. A method according to claim 15, wherein the mixture further comprises (E') at least one surfactant and water.

24. A method according to claim 23, wherein the surfactants are selected from the group consisting of (i) at least one anionic surfactant, (ii) at least one nonionic surfactant, (iii) at least one cationic surfactant, a mixture of (i) and (ii), and a mixture of (ii) and (iii).

25. A method according to claim 15, wherein the mixture further comprises (E") at least one dispersant and water.

26. A method according to claim 25, wherein the dispersants are water soluble organic polymers selected from the group consisting of carboxymethyl cellulose, gelatin, gum agar, polyvinyl alcohol, polyacrylic acid, polymethacrylic acid, hydroxy propylmethyl cellulose, methyl cellulose, colloidal silica, and colloidal clay.

27. A method according to claim 15, wherein the mixture further comprises (E''') at least one suspending agent and water.

28. A method according to claim 27, wherein the suspending agents are water insoluble inorganic dispersants selected from the group consisting of hydroxyapatite, barium sulfate, kaolin, and magnesium silicates.

29. A method according to claim 15, wherein the mixture of (I) is heated at a temperature of from 50° C. to 100° C.

30. A method according to claim 15, wherein component (A) is a vinyl ester.

31. A method according to claim 22, wherein component (A) is a vinyl ester.

32. A method according to claim 23, wherein component (A) is a vinyl ester.

33. A method according to claim 25, wherein component (A) is a vinyl ester.

34. A method according to claim 27, wherein component (A) is a vinyl ester.

35. A method according to claim 30, wherein the method further comprises adding a base compound to the product of step (I).

36. A method according to claim 31, wherein the method further comprises adding a base compound to the product of step (I).

37. A method according to claim 32, wherein the method further comprises adding a base compound to the product of step (I).

38. A method according to claim 33, wherein the method further comprises adding a base compound to the product of step (I).

39. A method according to claim 34, wherein the method further comprises adding a base compound to the product of step (I).

* * * * *